United States Patent
Graff et al.

(10) Patent No.: US 12,498,452 B2
(45) Date of Patent: Dec. 16, 2025

(54) RADAR SYSTEM WITH ENHANCED PROCESSING FOR INCREASED CONTRAST RATIO, IMPROVED ANGULAR SEPARABILITY AND ACCURACY, AND ELIMINATION OF GHOST TARGETS IN A SINGLE-SNAPSHOT

(71) Applicant: UHNDER, INC., Austin, TX (US)

(72) Inventors: Andrew Graff, Austin, TX (US); Lun Chen, Round Rock, TX (US); Murtaza Ali, Cedar Park, TX (US); Jingning Tang, Pflugerville, TX (US); Suleyman Gokhun Tanyer, Victoria (CA); Paul W. Dent, Pittsboro, NC (US)

(73) Assignee: Robert Bosch GmbH, Gerlingen (DE)

( * ) Notice: Subject to any disclaimer, the term of this patent is extended or adjusted under 35 U.S.C. 154(b) by 382 days.

(21) Appl. No.: 18/060,158

(22) Filed: Nov. 30, 2022

(65) Prior Publication Data
US 2023/0176179 A1  Jun. 8, 2023

Related U.S. Application Data

(60) Provisional application No. 63/285,258, filed on Dec. 2, 2021.

(51) Int. Cl.
*G01S 7/292* (2006.01)
*G01S 7/35* (2006.01)
*G01S 13/02* (2006.01)

(52) U.S. Cl.
CPC ............ *G01S 7/2927* (2013.01); *G01S 7/354* (2013.01); *G01S 2013/0245* (2013.01)

(58) Field of Classification Search
CPC . G01S 7/2927; G01S 7/354; G01S 2013/0245
See application file for complete search history.

(56) References Cited

U.S. PATENT DOCUMENTS

| | | |
|---|---|---|
| 1,882,128 A | 10/1932 | Fearing |
| 3,374,478 A | 3/1968 | Blau |
| (Continued) | | |

FOREIGN PATENT DOCUMENTS

| | | | | |
|---|---|---|---|---|
| CN | 111630404 B | * 10/2023 | ........... | G01S 13/343 |
| EP | 0509843 | 10/1992 | | |
| (Continued) | | | | |

OTHER PUBLICATIONS

Chambers et al., An article entitled "Real-Time Vehicle Mounted Multistatic Ground Penetrating Radar Imaging System for Buried Object Detection," Lawrence Livermore National Laboratory Reports (LLNL-TR-615452), Feb. 4, 2013; Retrieved from the Internet from https://e-reports-ext.llnl.gov/pdf/711892.pdf.

(Continued)

*Primary Examiner* — Isam A Alsomiri
(74) *Attorney, Agent, or Firm* — Gardner, Linn, Burkhart & Ondersma LLP

(57) ABSTRACT

A radar system with enhanced processing for increased contrast ratio, improved angular separability and accuracy, and elimination of ghost targets. The radar system is equipped with transmitters, receivers, pluralities of transmit antennas, and pluralities of receive antennas. The enhanced processing chain on-board the radar system iteratively detects target(s) by first finding the strongest target, subtracting the estimated received signal from the detected target, and repeating the process for subsequent targets until a predefined number of iterations is completed or an exit condition is tripped. The enhanced processing chain's subtraction increases the contrast ratio of detectable targets. The detection is thus refined by determining optimal azimuth, elevation, gain, and phase of each detection through a joint optimization of all detections. The subtraction and refine- (Continued)

ment aid in eliminating ghost targets by removing sidelobe signals and residual errors that cause ghost targets to appear.

17 Claims, 12 Drawing Sheets

(56) References Cited

U.S. PATENT DOCUMENTS

| | | |
|---|---|---|
| 3,735,398 A | 5/1973 | Ross |
| 3,750,169 A | 7/1973 | Strenglein |
| 3,766,554 A | 10/1973 | Tresselt |
| 3,896,434 A | 7/1975 | Sirven |
| 3,932,871 A | 1/1976 | Foote |
| 4,078,234 A | 3/1978 | Fishbein et al. |
| 4,176,351 A | 11/1979 | De Vita et al. |
| 4,308,536 A | 12/1981 | Sims, Jr. et al. |
| 4,566,010 A | 1/1986 | Collins |
| 4,612,547 A | 9/1986 | Itoh |
| 4,882,668 A | 11/1989 | Schmid et al. |
| 4,910,464 A | 3/1990 | Trett et al. |
| 4,939,685 A | 7/1990 | Feintuch |
| 5,001,486 A | 3/1991 | Bächtiger |
| 5,012,254 A | 4/1991 | Thompson |
| 5,034,906 A | 7/1991 | Chang |
| 5,087,918 A | 2/1992 | May et al. |
| 5,151,702 A | 9/1992 | Urkowitz |
| 5,175,710 A | 12/1992 | Hutson |
| 5,218,619 A | 6/1993 | Dent |
| 5,272,663 A | 12/1993 | Jones et al. |
| 5,280,288 A | 1/1994 | Sherry et al. |
| 5,302,956 A | 4/1994 | Asbury et al. |
| 5,341,141 A | 8/1994 | Frazier et al. |
| 5,345,470 A | 9/1994 | Alexander |
| 5,361,072 A | 11/1994 | Barrick et al. |
| 5,376,939 A | 12/1994 | Urkowitz |
| 5,379,322 A | 1/1995 | Kosaka et al. |
| 5,436,872 A | 7/1995 | Gilmour et al. |
| 5,497,162 A | 3/1996 | Kaiser |
| 5,508,706 A | 4/1996 | Tsou et al. |
| 5,581,464 A | 12/1996 | Woll et al. |
| 5,654,715 A | 8/1997 | Hayashikura et al. |
| 5,657,021 A | 8/1997 | Ehsani-Nategh et al. |
| 5,657,023 A | 8/1997 | Lewis et al. |
| 5,682,605 A | 10/1997 | Salter |
| 5,691,724 A | 11/1997 | Aker et al. |
| 5,712,640 A | 1/1998 | Andou |
| 5,724,041 A | 3/1998 | Inoue et al. |
| 5,847,661 A | 12/1998 | Ricci |
| 5,892,477 A | 4/1999 | Wehling |
| 5,917,430 A | 6/1999 | Greneker, III et al. |
| 5,920,285 A | 7/1999 | Benjamin |
| 5,931,893 A | 8/1999 | Dent et al. |
| 5,959,571 A | 9/1999 | Aoyagi et al. |
| 5,970,400 A | 10/1999 | Dwyer |
| 6,048,315 A | 4/2000 | Chiao et al. |
| 6,067,314 A | 5/2000 | Azuma |
| 6,069,581 A | 5/2000 | Bell et al. |
| 6,121,872 A | 9/2000 | Weishaupt |
| 6,121,918 A | 9/2000 | Tullsson |
| 6,151,366 A | 11/2000 | Yip |
| 6,163,252 A | 12/2000 | Nishiwaki |
| 6,184,829 B1 | 2/2001 | Stilp |
| 6,191,726 B1 | 2/2001 | Tullsson |
| 6,208,248 B1 | 3/2001 | Ross |
| 6,288,672 B1 | 9/2001 | Asano et al. |
| 6,307,622 B1 | 10/2001 | Lewis |
| 6,335,700 B1 | 1/2002 | Ashihara |
| 6,347,264 B2 | 2/2002 | Nicosia et al. |
| 6,396,436 B1 | 5/2002 | Lissel et al. |
| 6,400,308 B1 | 6/2002 | Bell et al. |
| 6,411,250 B1 | 6/2002 | Oswald et al. |
| 6,417,796 B1 | 7/2002 | Bowlds |
| 6,424,289 B2 | 7/2002 | Fukae et al. |
| 6,547,733 B2 | 4/2003 | Hwang et al. |
| 6,583,753 B1 | 6/2003 | Reed |
| 6,614,387 B1 | 9/2003 | Deadman |
| 6,624,784 B1 | 9/2003 | Yamaguchi |
| 6,674,908 B1 | 1/2004 | Aronov |
| 6,683,560 B2 | 1/2004 | Bauhahn |
| 6,693,582 B2 | 2/2004 | Steinlechner et al. |
| 6,714,956 B1 | 3/2004 | Liu et al. |
| 6,747,595 B2 | 6/2004 | Hirabe |
| 6,768,391 B1 | 7/2004 | Dent et al. |
| 6,865,218 B1 | 3/2005 | Sourour |
| 6,867,732 B1 | 3/2005 | Chen et al. |
| 6,888,491 B2 | 5/2005 | Richter |
| 6,975,246 B1 | 12/2005 | Trudeau |
| 7,066,886 B2 | 6/2006 | Song et al. |
| 7,119,739 B1 | 10/2006 | Struckman |
| 7,130,663 B2 | 10/2006 | Guo |
| 7,202,776 B2 | 4/2007 | Breed |
| 7,289,058 B2 | 10/2007 | Shima |
| 7,299,251 B2 | 11/2007 | Skidmore et al. |
| 7,338,450 B2 | 3/2008 | Kristofferson et al. |
| 7,395,084 B2 | 7/2008 | Anttila |
| 7,460,055 B2 | 12/2008 | Nishijima et al. |
| 7,474,258 B1 | 1/2009 | Arikan et al. |
| 7,545,310 B2 | 6/2009 | Matsuoka |
| 7,545,321 B2 | 6/2009 | Kawasaki |
| 7,564,400 B2 | 7/2009 | Fukuda |
| 7,567,204 B2 | 7/2009 | Sakamoto |
| 7,609,198 B2 | 10/2009 | Chang |
| 7,642,952 B2 | 1/2010 | Fukuda |
| 7,663,533 B2 | 2/2010 | Toennesen |
| 7,667,637 B2 | 2/2010 | Pedersen et al. |
| 7,728,762 B2 | 6/2010 | Sakamoto |
| 7,791,528 B2 | 9/2010 | Klotzbuecher |
| 7,847,731 B2 | 12/2010 | Wiesbeck et al. |
| 7,855,677 B2 | 12/2010 | Negoro et al. |
| 7,859,450 B2 | 12/2010 | Shirakawa et al. |
| 8,019,352 B2 | 9/2011 | Rappaport et al. |
| 8,044,845 B2 | 10/2011 | Saunders |
| 8,049,663 B2 | 11/2011 | Frank et al. |
| 8,059,026 B1 | 11/2011 | Nunez |
| 8,102,306 B2 | 1/2012 | Smith, Jr. et al. |
| 8,115,672 B2 | 2/2012 | Nouvel et al. |
| 8,154,436 B2 | 4/2012 | Szajnowski |
| 8,169,359 B2 | 5/2012 | Aoyagi |
| 8,212,713 B2 | 7/2012 | Aiga et al. |
| 8,330,650 B2 | 12/2012 | Goldman |
| 8,390,507 B2 | 3/2013 | Wintermantel |
| 8,471,760 B2 | 6/2013 | Szajnowski |
| 8,532,159 B2 | 9/2013 | Kagawa et al. |
| 8,547,988 B2 | 10/2013 | Hadani et al. |
| 8,686,894 B2 | 4/2014 | Fukuda et al. |
| 8,694,306 B1 | 4/2014 | Short et al. |
| 8,994,581 B1 | 3/2015 | Brown |
| 9,020,011 B1 | 4/2015 | Hiebert et al. |
| 9,121,943 B2 | 9/2015 | Stirlin-Gallacher et al. |
| 9,182,479 B2 | 11/2015 | Chen et al. |
| 9,239,378 B2 | 1/2016 | Kishigami et al. |
| 9,239,379 B2 | 1/2016 | Burgio et al. |
| 9,274,217 B2 | 3/2016 | Chang et al. |
| 9,282,945 B2 | 3/2016 | Smith et al. |
| 9,335,402 B2 | 5/2016 | Maeno et al. |
| 9,400,328 B2 | 7/2016 | Hsiao et al. |
| 9,541,639 B2 | 1/2017 | Searcy et al. |
| 9,568,600 B2 | 2/2017 | Alland |
| 9,575,160 B1 | 2/2017 | Davis et al. |
| 9,599,702 B1 | 3/2017 | Bordes et al. |
| 9,689,967 B1 | 6/2017 | Stark et al. |
| 9,720,073 B1 | 8/2017 | Davis et al. |
| 9,720,080 B1 | 8/2017 | Rodenbeck |
| 9,753,121 B1 | 9/2017 | Davis |
| 9,753,132 B1 | 9/2017 | Bordes et al. |
| 9,772,397 B1 | 9/2017 | Bordes et al. |
| 9,791,551 B1 | 10/2017 | Eshraghi et al. |
| 9,791,564 B1 | 10/2017 | Harris et al. |
| 9,806,914 B1 | 10/2017 | Bordes et al. |
| 9,829,567 B1 | 11/2017 | Davis et al. |
| 9,846,228 B2 | 12/2017 | Davis et al. |
| 9,869,762 B1 | 1/2018 | Alland et al. |
| 9,945,935 B2 | 4/2018 | Eshraghi et al. |
| 9,954,955 B2 | 4/2018 | Davis et al. |

(56) References Cited

U.S. PATENT DOCUMENTS

| | | | |
|---|---|---|---|
| 9,971,020 B1 | 5/2018 | Maher et al. | |
| 9,989,627 B2 | 6/2018 | Eshraghi et al. | |
| 9,989,638 B2 | 6/2018 | Harris et al. | |
| 10,073,171 B2 | 9/2018 | Bordes et al. | |
| 10,090,585 B2 | 10/2018 | Dinc et al. | |
| 10,092,192 B2 | 10/2018 | Lashkari et al. | |
| 10,142,133 B2 | 11/2018 | Bordes et al. | |
| 10,145,954 B2 | 12/2018 | Davis et al. | |
| 10,191,142 B2 | 1/2019 | Eshraghi et al. | |
| 10,197,671 B2 | 2/2019 | Alland et al. | |
| 10,215,853 B2 | 2/2019 | Stark et al. | |
| 10,261,179 B2 | 4/2019 | Davis et al. | |
| 10,305,611 B1 | 5/2019 | Rimini et al. | |
| 10,324,165 B2 | 6/2019 | Bordes et al. | |
| 10,386,470 B2 | 8/2019 | Zivkovic | |
| 10,536,529 B2 | 1/2020 | Davis et al. | |
| 10,551,482 B2 | 2/2020 | Eshraghi et al. | |
| 10,573,959 B2 | 2/2020 | Alland et al. | |
| 10,594,916 B2 | 3/2020 | Sivan | |
| 10,605,894 B2 | 3/2020 | Davis et al. | |
| 10,670,695 B2 | 6/2020 | Maher et al. | |
| 10,775,478 B2 | 9/2020 | Davis et al. | |
| 10,805,933 B2 | 10/2020 | Stephens et al. | |
| 10,812,985 B2 | 10/2020 | Mody et al. | |
| 10,852,408 B2 | 12/2020 | Aslett et al. | |
| 10,866,306 B2 | 12/2020 | Maher et al. | |
| 10,908,272 B2 | 2/2021 | Rao et al. | |
| 10,935,633 B2 | 3/2021 | Maher et al. | |
| 10,976,431 B2 | 4/2021 | Harris et al. | |
| 11,054,516 B2 | 7/2021 | Wu et al. | |
| 11,086,010 B2 | 8/2021 | Davis et al. | |
| 11,105,890 B2 | 8/2021 | Behrens et al. | |
| 11,175,377 B2 | 11/2021 | Bordes et al. | |
| 11,194,016 B2 | 12/2021 | Eshraghi et al. | |
| 11,262,448 B2 | 3/2022 | Davis et al. | |
| 11,271,328 B2 | 3/2022 | Liu et al. | |
| 11,340,331 B2 | 5/2022 | Maher et al. | |
| 11,454,697 B2 | 9/2022 | Maher et al. | |
| 11,474,225 B2* | 10/2022 | Dent et al. | |
| 11,774,583 B2* | 10/2023 | Armstrong-Crews | G01S 7/292 342/70 |
| 2001/0002919 A1 | 6/2001 | Sourour et al. | |
| 2002/0004692 A1 | 1/2002 | Nicosia et al. | |
| 2002/0044082 A1 | 4/2002 | Woodington et al. | |
| 2002/0075178 A1 | 6/2002 | Woodington et al. | |
| 2002/0118522 A1 | 8/2002 | Ho et al. | |
| 2002/0130811 A1 | 9/2002 | Voigtlaender | |
| 2002/0147534 A1 | 10/2002 | Delcheccolo et al. | |
| 2002/0155811 A1 | 10/2002 | Prismantas | |
| 2003/0001772 A1 | 1/2003 | Woodington et al. | |
| 2003/0011519 A1 | 1/2003 | Breglia et al. | |
| 2003/0058166 A1 | 3/2003 | Hirabe | |
| 2003/0073463 A1 | 4/2003 | Shapira | |
| 2003/0080713 A1 | 5/2003 | Kirmuss | |
| 2003/0102997 A1 | 6/2003 | Levin et al. | |
| 2003/0164791 A1 | 9/2003 | Shinoda et al. | |
| 2003/0235244 A1 | 12/2003 | Pessoa et al. | |
| 2004/0012516 A1 | 1/2004 | Schiffmann | |
| 2004/0015529 A1 | 1/2004 | Tanrikulu et al. | |
| 2004/0066323 A1 | 4/2004 | Richter | |
| 2004/0070532 A1 | 4/2004 | Ishii et al. | |
| 2004/0107030 A1 | 6/2004 | Nishira et al. | |
| 2004/0138802 A1 | 7/2004 | Kuragaki et al. | |
| 2004/0215373 A1 | 10/2004 | Won et al. | |
| 2004/0229590 A1 | 11/2004 | Kubo et al. | |
| 2005/0001757 A1 | 1/2005 | Shinoda et al. | |
| 2005/0008065 A1 | 1/2005 | Schilling | |
| 2005/0069162 A1 | 3/2005 | Haykin | |
| 2005/0090274 A1 | 4/2005 | Miyashita | |
| 2005/0156780 A1 | 7/2005 | Bonthron et al. | |
| 2005/0201457 A1 | 9/2005 | Allred et al. | |
| 2005/0225476 A1 | 10/2005 | Hoetzel et al. | |
| 2005/0273480 A1 | 12/2005 | Pugh et al. | |
| 2006/0012511 A1 | 1/2006 | Dooi et al. | |
| 2006/0036353 A1 | 2/2006 | Wintermantel | |
| 2006/0050707 A1 | 3/2006 | Sterin | |
| 2006/0093078 A1 | 5/2006 | Lewis et al. | |
| 2006/0109170 A1 | 5/2006 | Voigtlaender et al. | |
| 2006/0109931 A1 | 5/2006 | Asai | |
| 2006/0114324 A1 | 6/2006 | Farmer et al. | |
| 2006/0140249 A1 | 6/2006 | Kohno | |
| 2006/0181448 A1 | 8/2006 | Natsume et al. | |
| 2006/0220943 A1 | 10/2006 | Schlick et al. | |
| 2006/0244653 A1 | 11/2006 | Szajnowski | |
| 2006/0262007 A1 | 11/2006 | Bonthron | |
| 2006/0262009 A1 | 11/2006 | Watanabe | |
| 2007/0018884 A1 | 1/2007 | Adams | |
| 2007/0018886 A1 | 1/2007 | Watanabe et al. | |
| 2007/0040729 A1* | 2/2007 | Ohnishi | G01S 7/292 342/134 |
| 2007/0096885 A1 | 5/2007 | Cheng et al. | |
| 2007/0109175 A1 | 5/2007 | Fukuda | |
| 2007/0115869 A1 | 5/2007 | Lakkis | |
| 2007/0120731 A1 | 5/2007 | Kelly et al. | |
| 2007/0132633 A1 | 6/2007 | Uchino | |
| 2007/0152870 A1 | 7/2007 | Woodington et al. | |
| 2007/0152871 A1 | 7/2007 | Puglia | |
| 2007/0152872 A1 | 7/2007 | Woodington | |
| 2007/0164896 A1 | 7/2007 | Suzuki et al. | |
| 2007/0171122 A1 | 7/2007 | Nakano | |
| 2007/0182619 A1 | 8/2007 | Honda et al. | |
| 2007/0182623 A1 | 8/2007 | Zeng | |
| 2007/0188373 A1 | 8/2007 | Shirakawa et al. | |
| 2007/0200747 A1 | 8/2007 | Okai | |
| 2007/0263748 A1 | 11/2007 | Mesecher | |
| 2007/0279303 A1 | 12/2007 | Schoebel | |
| 2008/0080599 A1 | 4/2008 | Kang | |
| 2008/0088499 A1 | 4/2008 | Bonthron | |
| 2008/0094274 A1 | 4/2008 | Nakanishi | |
| 2008/0150790 A1 | 6/2008 | Voigtlaender et al. | |
| 2008/0180311 A1 | 7/2008 | Mikami | |
| 2008/0208472 A1 | 8/2008 | Morcom | |
| 2008/0218406 A1 | 9/2008 | Nakanishi | |
| 2008/0258964 A1 | 10/2008 | Schoeberl | |
| 2008/0272955 A1 | 11/2008 | Yonak et al. | |
| 2009/0003412 A1 | 1/2009 | Negoro et al. | |
| 2009/0015459 A1 | 1/2009 | Mahler et al. | |
| 2009/0015464 A1 | 1/2009 | Fukuda | |
| 2009/0027257 A1 | 1/2009 | Arikan | |
| 2009/0046000 A1 | 2/2009 | Matsuoka | |
| 2009/0051581 A1 | 2/2009 | Hatono | |
| 2009/0072957 A1 | 3/2009 | Wu et al. | |
| 2009/0073025 A1 | 3/2009 | Inoue et al. | |
| 2009/0074031 A1 | 3/2009 | Fukuda | |
| 2009/0079617 A1 | 3/2009 | Shirakawa et al. | |
| 2009/0085827 A1 | 4/2009 | Orime et al. | |
| 2009/0103593 A1 | 4/2009 | Bergamo | |
| 2009/0121918 A1 | 5/2009 | Shirai et al. | |
| 2009/0212998 A1 | 8/2009 | Szajnowski | |
| 2009/0232510 A1 | 9/2009 | Gupta et al. | |
| 2009/0237293 A1 | 9/2009 | Sakuma | |
| 2009/0254260 A1 | 10/2009 | Nix et al. | |
| 2009/0267822 A1 | 10/2009 | Shinoda et al. | |
| 2009/0289831 A1 | 11/2009 | Akita | |
| 2009/0295623 A1 | 12/2009 | Falk | |
| 2010/0001897 A1 | 1/2010 | Lyman | |
| 2010/0019950 A1 | 1/2010 | Yamano et al. | |
| 2010/0039311 A1 | 2/2010 | Woodington et al. | |
| 2010/0039313 A1 | 2/2010 | Morris | |
| 2010/0075704 A1 | 3/2010 | McHenry et al. | |
| 2010/0116365 A1 | 5/2010 | McCarty | |
| 2010/0127916 A1 | 5/2010 | Sakai et al. | |
| 2010/0156690 A1 | 6/2010 | Kim et al. | |
| 2010/0166121 A1 | 7/2010 | Kenney, Jr. | |
| 2010/0198513 A1 | 8/2010 | Zeng et al. | |
| 2010/0202495 A1 | 8/2010 | Kagawa et al. | |
| 2010/0253573 A1 | 10/2010 | Holzheimer et al. | |
| 2010/0277359 A1 | 11/2010 | Ando | |
| 2010/0289692 A1 | 11/2010 | Winkler | |
| 2011/0006944 A1 | 1/2011 | Goldman | |
| 2011/0032138 A1 | 2/2011 | Krapf | |
| 2011/0074620 A1 | 3/2011 | Wintermantel | |
| 2011/0187600 A1 | 8/2011 | Landt | |

(56) References Cited

U.S. PATENT DOCUMENTS

| | | |
|---|---|---|
| 2011/0196568 A1 | 8/2011 | Nickolaou |
| 2011/0234448 A1 | 9/2011 | Hayase |
| 2011/0248796 A1 | 10/2011 | Pozgay |
| 2011/0279303 A1 | 11/2011 | Smith, Jr. et al. |
| 2011/0279307 A1 | 11/2011 | Song |
| 2011/0285576 A1 | 11/2011 | Lynam |
| 2011/0291874 A1 | 12/2011 | De Mersseman |
| 2011/0291875 A1 | 12/2011 | Szajnowski |
| 2011/0292971 A1 | 12/2011 | Hadani et al. |
| 2011/0298653 A1 | 12/2011 | Mizutani |
| 2012/0001791 A1 | 1/2012 | Wintermantel |
| 2012/0050092 A1 | 3/2012 | Lee et al. |
| 2012/0050093 A1 | 3/2012 | Heilmann et al. |
| 2012/0105268 A1 | 5/2012 | Smits et al. |
| 2012/0112957 A1 | 5/2012 | Nguyen et al. |
| 2012/0133547 A1 | 5/2012 | MacDonald et al. |
| 2012/0146834 A1 | 6/2012 | Karr |
| 2012/0173246 A1 | 7/2012 | Choi et al. |
| 2012/0195349 A1 | 8/2012 | Lakkis |
| 2012/0249356 A1 | 10/2012 | Shope |
| 2012/0257643 A1 | 10/2012 | Wu et al. |
| 2012/0283987 A1 | 11/2012 | Busking et al. |
| 2012/0314799 A1 | 12/2012 | In De Betou et al. |
| 2012/0319900 A1 | 12/2012 | Johansson et al. |
| 2013/0016761 A1 | 1/2013 | Nentwig |
| 2013/0021196 A1 | 1/2013 | Himmelstoss |
| 2013/0027240 A1 | 1/2013 | Chowdhury |
| 2013/0057436 A1 | 3/2013 | Krasner et al. |
| 2013/0069818 A1 | 3/2013 | Shirakawa et al. |
| 2013/0102254 A1 | 4/2013 | Cyzs |
| 2013/0113647 A1 | 5/2013 | Sentelle et al. |
| 2013/0113652 A1 | 5/2013 | Smits et al. |
| 2013/0113653 A1 | 5/2013 | Kishigami et al. |
| 2013/0135140 A1 | 5/2013 | Kishigami |
| 2013/0169468 A1 | 7/2013 | Johnson et al. |
| 2013/0169485 A1 | 7/2013 | Lynch |
| 2013/0176154 A1 | 7/2013 | Bonaccio et al. |
| 2013/0214961 A1 | 8/2013 | Lee et al. |
| 2013/0229301 A1 | 9/2013 | Kanamoto |
| 2013/0244710 A1 | 9/2013 | Nguyen et al. |
| 2013/0249730 A1 | 9/2013 | Adcook |
| 2013/0314271 A1 | 11/2013 | Braswell et al. |
| 2013/0321196 A1 | 12/2013 | Binzer et al. |
| 2014/0022108 A1 | 1/2014 | Alberth, Jr. et al. |
| 2014/0028491 A1 | 1/2014 | Ferguson |
| 2014/0035774 A1 | 2/2014 | Khlifi |
| 2014/0049423 A1 | 2/2014 | De Jong et al. |
| 2014/0070985 A1 | 3/2014 | Vacanti |
| 2014/0085128 A1 | 3/2014 | Kishigami et al. |
| 2014/0097987 A1 | 4/2014 | Worl et al. |
| 2014/0111367 A1 | 4/2014 | Kishigami et al. |
| 2014/0111372 A1 | 4/2014 | Wu |
| 2014/0139322 A1 | 5/2014 | Wang et al. |
| 2014/0159948 A1 | 6/2014 | Ishimori et al. |
| 2014/0168004 A1 | 6/2014 | Chen et al. |
| 2014/0220903 A1 | 8/2014 | Schulz et al. |
| 2014/0253345 A1 | 9/2014 | Breed |
| 2014/0253364 A1 | 9/2014 | Lee et al. |
| 2014/0285373 A1 | 9/2014 | Kuwahara et al. |
| 2014/0316261 A1 | 10/2014 | Lux et al. |
| 2014/0327566 A1 | 11/2014 | Burgio et al. |
| 2014/0340254 A1 | 11/2014 | Hesse |
| 2014/0348253 A1 | 11/2014 | Mobasher et al. |
| 2014/0350815 A1 | 11/2014 | Kambe |
| 2015/0002329 A1 | 1/2015 | Murad et al. |
| 2015/0002357 A1 | 1/2015 | Sanford et al. |
| 2015/0035662 A1 | 2/2015 | Bowers et al. |
| 2015/0061922 A1 | 3/2015 | Kishigami |
| 2015/0103745 A1 | 4/2015 | Negus et al. |
| 2015/0153445 A1 | 6/2015 | Jansen |
| 2015/0160335 A1 | 6/2015 | Lynch et al. |
| 2015/0198709 A1 | 7/2015 | Inoue |
| 2015/0204966 A1 | 7/2015 | Kishigami |
| 2015/0204971 A1 | 7/2015 | Yoshimura et al. |
| 2015/0204972 A1 | 7/2015 | Kuehnle et al. |
| 2015/0226838 A1 | 8/2015 | Hayakawa |
| 2015/0226848 A1 | 8/2015 | Park |
| 2015/0234045 A1 | 8/2015 | Rosenblum |
| 2015/0247924 A1 | 9/2015 | Kishigami |
| 2015/0255867 A1 | 9/2015 | Inoue |
| 2015/0280893 A1 | 10/2015 | Choi et al. |
| 2015/0301172 A1 | 10/2015 | Ossowska |
| 2015/0323660 A1 | 11/2015 | Hampikian |
| 2015/0331090 A1 | 11/2015 | Jeong et al. |
| 2015/0333847 A1 | 11/2015 | Bharadia et al. |
| 2015/0346323 A1 | 12/2015 | Kollmer |
| 2015/0369912 A1 | 12/2015 | Kishigami et al. |
| 2015/0373167 A1 | 12/2015 | Murashov et al. |
| 2016/0003938 A1 | 1/2016 | Gazit et al. |
| 2016/0003939 A1 | 1/2016 | Stainvas Olshansky et al. |
| 2016/0018511 A1 | 1/2016 | Nayyar et al. |
| 2016/0025844 A1 | 1/2016 | Mckitterick et al. |
| 2016/0033623 A1 | 2/2016 | Holder |
| 2016/0033631 A1 | 2/2016 | Searcy et al. |
| 2016/0033632 A1 | 2/2016 | Searcy et al. |
| 2016/0041260 A1 | 2/2016 | Cao et al. |
| 2016/0054441 A1 | 2/2016 | Kuo et al. |
| 2016/0061935 A1 | 3/2016 | McCloskey et al. |
| 2016/0084941 A1 | 3/2016 | Arage |
| 2016/0084943 A1 | 3/2016 | Arage |
| 2016/0091595 A1 | 3/2016 | Alcalde |
| 2016/0103206 A1 | 4/2016 | Pavao-Moreira et al. |
| 2016/0124075 A1 | 5/2016 | Vogt et al. |
| 2016/0124086 A1 | 5/2016 | Jansen et al. |
| 2016/0131742 A1 | 5/2016 | Schoor |
| 2016/0131752 A1 | 5/2016 | Jansen et al. |
| 2016/0139254 A1 | 5/2016 | Wittenberg |
| 2016/0146931 A1 | 5/2016 | Rao et al. |
| 2016/0154103 A1 | 6/2016 | Moriuchi |
| 2016/0157828 A1 | 6/2016 | Sumi et al. |
| 2016/0178732 A1 | 6/2016 | Oka et al. |
| 2016/0213258 A1 | 7/2016 | Lashkari et al. |
| 2016/0223643 A1 | 8/2016 | Li et al. |
| 2016/0223644 A1 | 8/2016 | Soga |
| 2016/0238694 A1 | 8/2016 | Kishigami |
| 2016/0245909 A1 | 8/2016 | Aslett et al. |
| 2016/0349365 A1 | 12/2016 | Ling |
| 2017/0010361 A1 | 1/2017 | Tanaka |
| 2017/0023661 A1 | 1/2017 | Richert |
| 2017/0023663 A1 | 1/2017 | Subburaj et al. |
| 2017/0074980 A1 | 3/2017 | Adib |
| 2017/0090015 A1 | 3/2017 | Breen et al. |
| 2017/0117950 A1 | 4/2017 | Strong |
| 2017/0153316 A1 | 6/2017 | Wintermantel |
| 2017/0176583 A1 | 6/2017 | Gulden et al. |
| 2017/0212213 A1 | 7/2017 | Kishigami |
| 2017/0219689 A1 | 8/2017 | Hung et al. |
| 2017/0223712 A1 | 8/2017 | Stephens et al. |
| 2017/0234968 A1 | 8/2017 | Roger et al. |
| 2017/0254879 A1 | 9/2017 | Tokieda, I et al. |
| 2017/0293025 A1 | 10/2017 | Davis et al. |
| 2017/0293027 A1 | 10/2017 | Stark et al. |
| 2017/0307728 A1 | 10/2017 | Eshraghi et al. |
| 2017/0309997 A1 | 10/2017 | Alland et al. |
| 2017/0310758 A1 | 10/2017 | Davis et al. |
| 2017/0336495 A1 | 11/2017 | Davis et al. |
| 2017/0363731 A1 | 12/2017 | Bordes et al. |
| 2018/0003799 A1 | 1/2018 | Yang et al. |
| 2018/0019755 A1 | 1/2018 | Josefsberg et al. |
| 2018/0074168 A1 | 3/2018 | Subburaj et al. |
| 2018/0095161 A1 | 4/2018 | Kellum et al. |
| 2018/0095163 A1 | 4/2018 | Lovberg et al. |
| 2018/0113191 A1 | 4/2018 | Villeval et al. |
| 2018/0115371 A1 | 4/2018 | Trotta et al. |
| 2018/0128913 A1* | 5/2018 | Bialer .................. G01S 13/89 |
| 2018/0149730 A1 | 5/2018 | Li et al. |
| 2018/0149736 A1 | 5/2018 | Alland et al. |
| 2018/0175907 A1 | 6/2018 | Marr |
| 2018/0231655 A1 | 8/2018 | Stark et al. |
| 2018/0252809 A1 | 9/2018 | Davis et al. |
| 2018/0271776 A1 | 9/2018 | Kazakevitch et al. |
| 2018/0294908 A1 | 10/2018 | Abdelmonem |
| 2018/0358706 A1 | 12/2018 | Kildal et al. |
| 2019/0064364 A1 | 2/2019 | Boysel et al. |

(56) References Cited

U.S. PATENT DOCUMENTS

| | | | |
|---|---|---|---|
| 2019/0072641 A1 | 3/2019 | Al-Stouhi et al. | |
| 2019/0146059 A1 | 5/2019 | Zanati et al. | |
| 2019/0178983 A1 | 6/2019 | Lin et al. | |
| 2019/0219685 A1 | 7/2019 | Shan | |
| 2019/0235050 A1 | 8/2019 | Maligeorgos et al. | |
| 2019/0324134 A1 | 10/2019 | Cattle | |
| 2019/0383929 A1 | 12/2019 | Melzer et al. | |
| 2020/0011983 A1 | 1/2020 | Kageme et al. | |
| 2020/0036487 A1 | 1/2020 | Hammond et al. | |
| 2020/0064455 A1 | 2/2020 | Schroder et al. | |
| 2020/0107249 A1 | 4/2020 | Stauffer et al. | |
| 2020/0142049 A1* | 5/2020 | Solodky | G01S 13/538 |
| 2020/0153907 A1 | 5/2020 | Davis et al. | |
| 2020/0191939 A1 | 6/2020 | Wu et al. | |
| 2020/0292665 A1 | 9/2020 | Maher et al. | |
| 2020/0292666 A1 | 9/2020 | Maher et al. | |
| 2020/0363499 A1 | 11/2020 | Mayer et al. | |
| 2020/0393536 A1 | 12/2020 | Stettiner | |
| 2021/0003664 A1 | 1/2021 | Davis et al. | |
| 2021/0156979 A1 | 5/2021 | Rao et al. | |
| 2021/0181301 A1 | 6/2021 | Maher et al. | |
| 2021/0190904 A1* | 6/2021 | Bourdoux | G01S 7/2813 |
| 2021/0364634 A1 | 11/2021 | Davis et al. | |
| 2021/0389414 A1 | 12/2021 | Behrens et al. | |
| 2022/0291335 A1 | 9/2022 | Maher et al. | |
| 2022/0350020 A1 | 11/2022 | Davis et al. | |

FOREIGN PATENT DOCUMENTS

| | | | |
|---|---|---|---|
| EP | 1826586 | 8/2007 | |
| EP | 0725480 | 11/2011 | |
| EP | 2374217 | 4/2013 | |
| EP | 2884299 | 6/2015 | |
| EP | 2821808 | 7/2015 | |
| EP | 3349038 A1 * | 7/2018 | |
| EP | 3062446 | 9/2018 | |
| EP | 3152956 | 3/2019 | |
| EP | 3483622 | 5/2019 | |
| FR | 2751086 | 1/1998 | |
| GB | 2529029 | 2/2016 | |
| JP | 2010243330 | 10/2010 | |
| KR | 101010522 | 1/2011 | |
| KR | 102088426 | 12/2020 | |
| WO | WO2008022981 | 2/2008 | |
| WO | WO2010/022156 | 2/2010 | |
| WO | WO2015175078 | 11/2015 | |
| WO | WO2015185058 | 12/2015 | |
| WO | WO2016011407 | 1/2016 | |
| WO | WO2016030656 | 3/2016 | |
| WO | WO2017187242 | 2/2017 | |
| WO | WO2017059961 | 4/2017 | |
| WO | WO2017175190 | 10/2017 | |
| WO | WO2017187330 | 11/2017 | |
| WO | WO-2020259916 A1 * | 12/2020 | G01S 13/04 |

OTHER PUBLICATIONS

Fraser, "Design and simulation of a coded sequence ground penetrating radar," In: Diss. University of British Columbia, Dec. 3, 2015.

Zhou et al., "Linear extractors for extracting randomness from noisy sources," In: Information Theory Proceedings (ISIT), 2011 IEEE International Symposium on Oct. 3, 2011.

V. Giannini et al., "A 79 GHz Phase-Modulated 4 GHz-BW CW Radar Transmitter in 28 nm CMOS," in IEEE Journal of Solid-State Circuits, vol. 49, No. 12, pp. 2925-2937, Dec. 2014. (Year: 2014).

Óscar Faus García, "Signal Processing for mm Wave MIMO Radar," University of Gavle, Faculty of Engineering and Sustainable Development, Jun. 2015; Retrieved from the Internet from http://www.diva-portal.se/smash/get/diva2:826028/FULLTEXT01.pdf.

Levanan Nadav et al., "Non-coherent pulse compression—aperiodic and periodic waveforms", IET Radar, Sonar & Navagation, The Institution of Engineering and Technology, Jan. 1, 2016, pp. 216-224, vol. 10, Iss. 1, UK.

Akihiro Kajiwara, "Stepped-FM Pulse Radar for Vehicular Collision Avoidance", Electronics and Communications in Japan, Part 1, Mar. 1998, pp. 234-239, vol. 82, No. 6 1999.

A. Bourdoux, U. Ahamd, D. Guermandi, S. Brebels, A. Dewilde, W. Van Thillo, PMCW "Waveform and MIMO Technique for a 79 GHz CMOS Automotive Radar", 2016 IEEE Radar Conference (RadarConf), 2016, pp. 1-5, doi: 10.1109/RADAR.2016.7485114. (Year: 2016).

V. Jain, F. Tzeng, L. Zhou and P. Heydari, "A single-Chip Dual-Band 22-29-GHz/77-81-GHz BiCMOS Transceiver for Automotive Radars," in IEEE Journal of Solid-State Circuits, vol. 44, No. 12, pp. 3469-3485, Dec. 2009, doi: 10.1109/JSSC.2009.2032583. (Year: 2009).

A. Medra et al., "An 80 GHz Low-Noise Amplifier Resilient to the TX Spillover in Phase-Modulated Continuous-Wave Radars," In IEEE Journal of Solid-State Circuits, vol. 51, No. 5, pp. 1141-1153, May 2016, doi: 10.1109/JSSC.2016.2520962. (Year: 2016).

International Search Report and Written Opinion from corresponding Patent Cooperation Treaty (PCT) Application No. PCT/IB22/61607, completed Feb. 13, 2023.

* cited by examiner

FIG. 6B
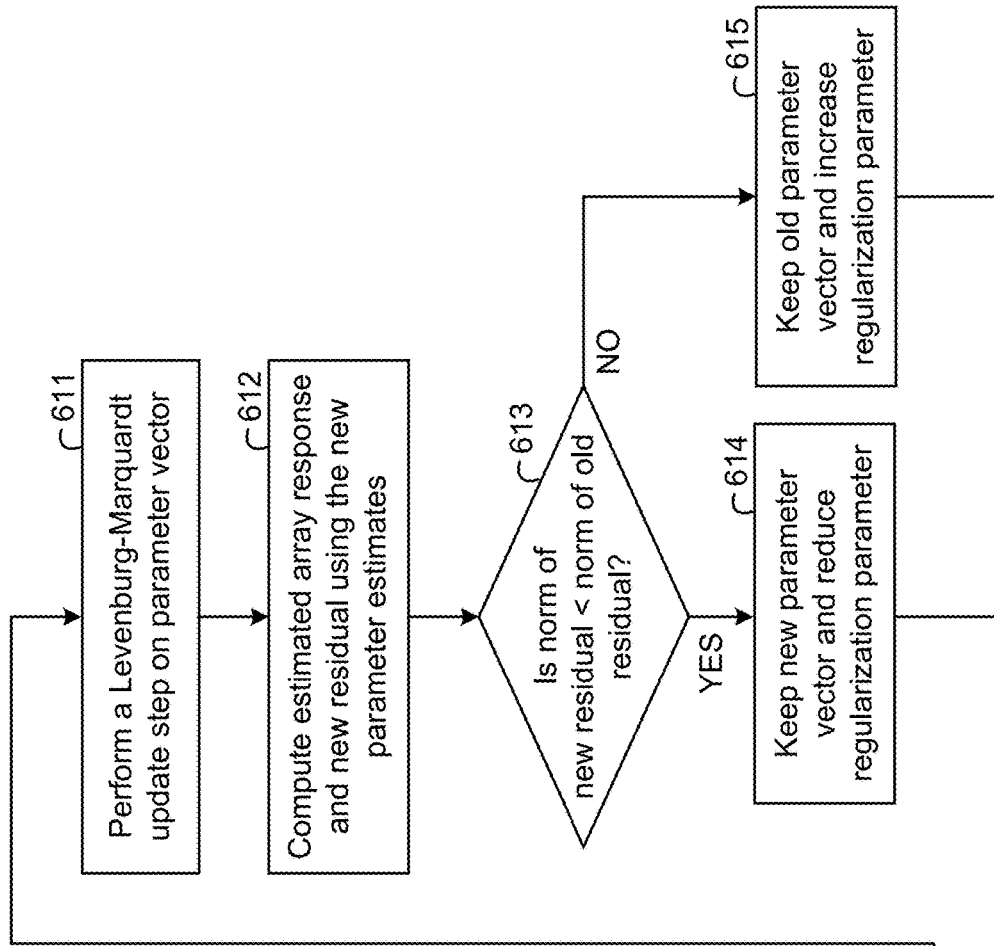
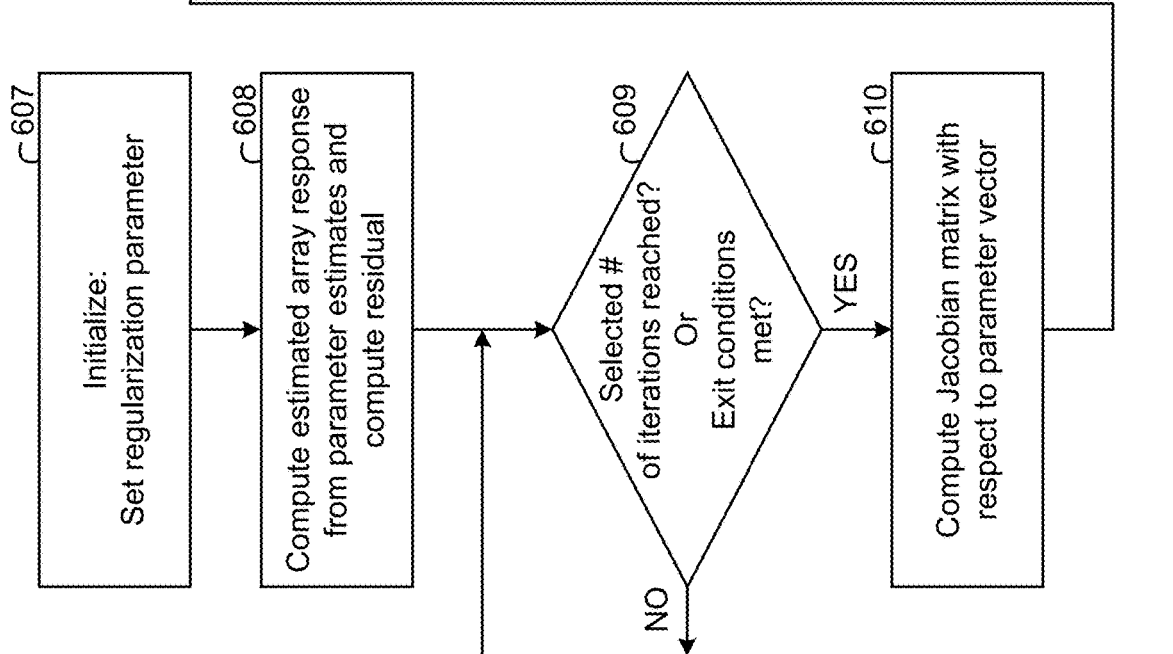

Non-linear Optimization for Parameter Estimation
Magnitude Estimate  701
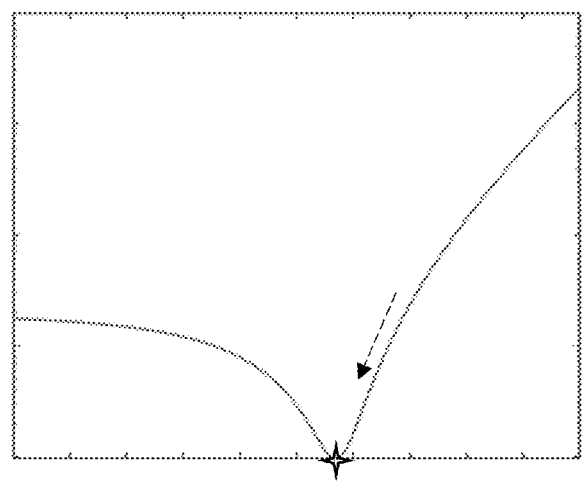
FIG. 7
Phase Estimate  702
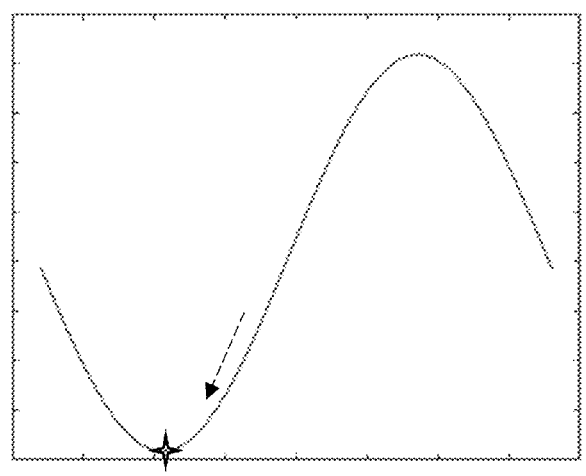
Angular Estimate  703
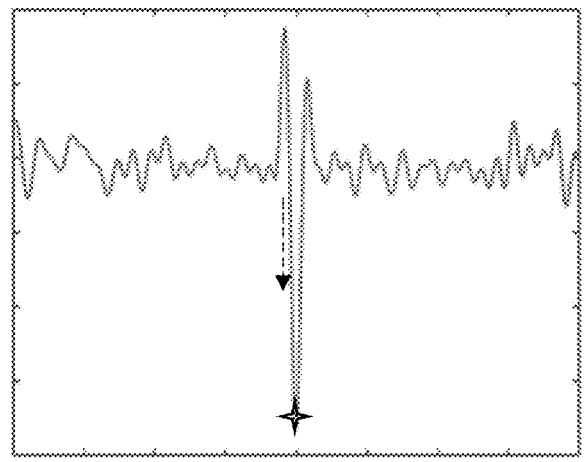

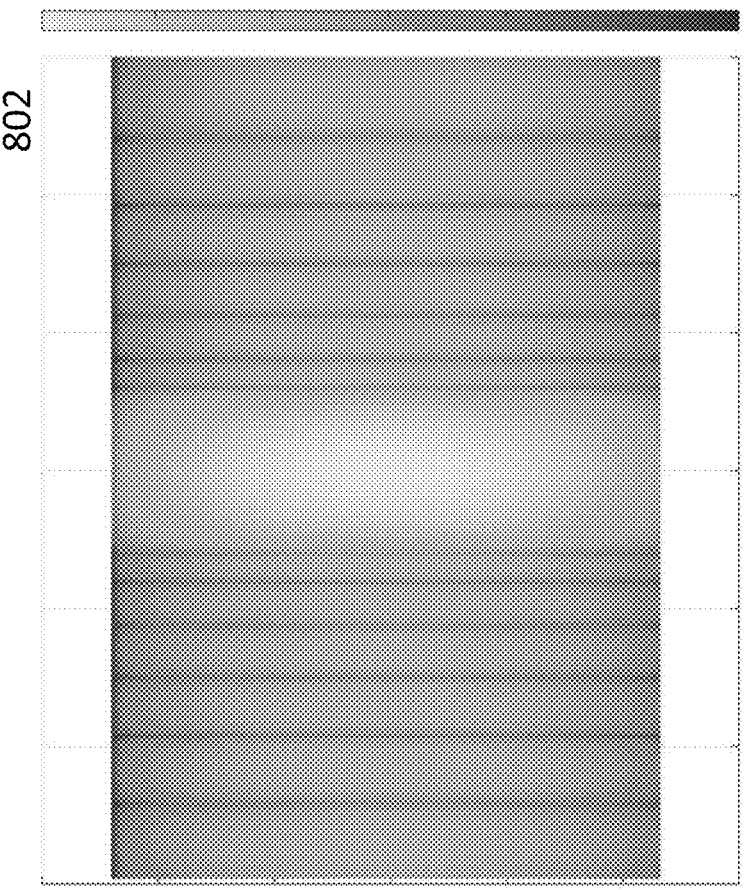
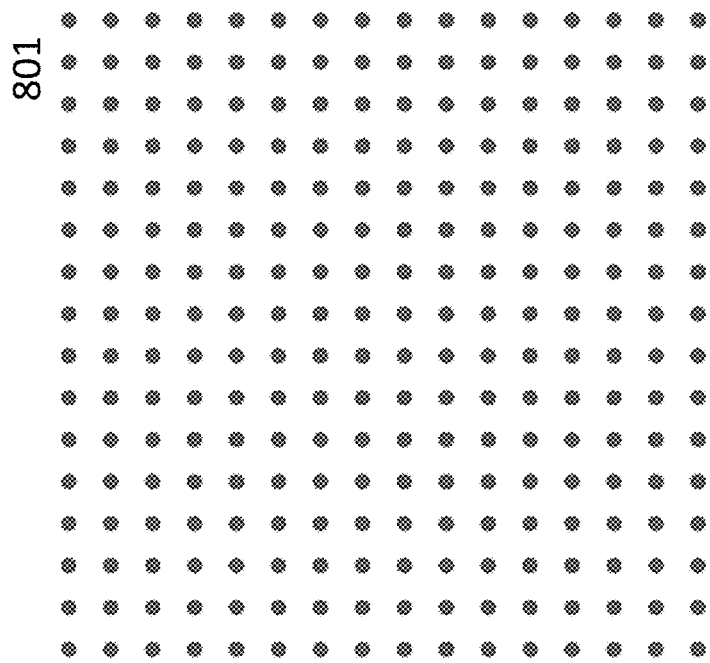
FIG. 8 – Uniform Array

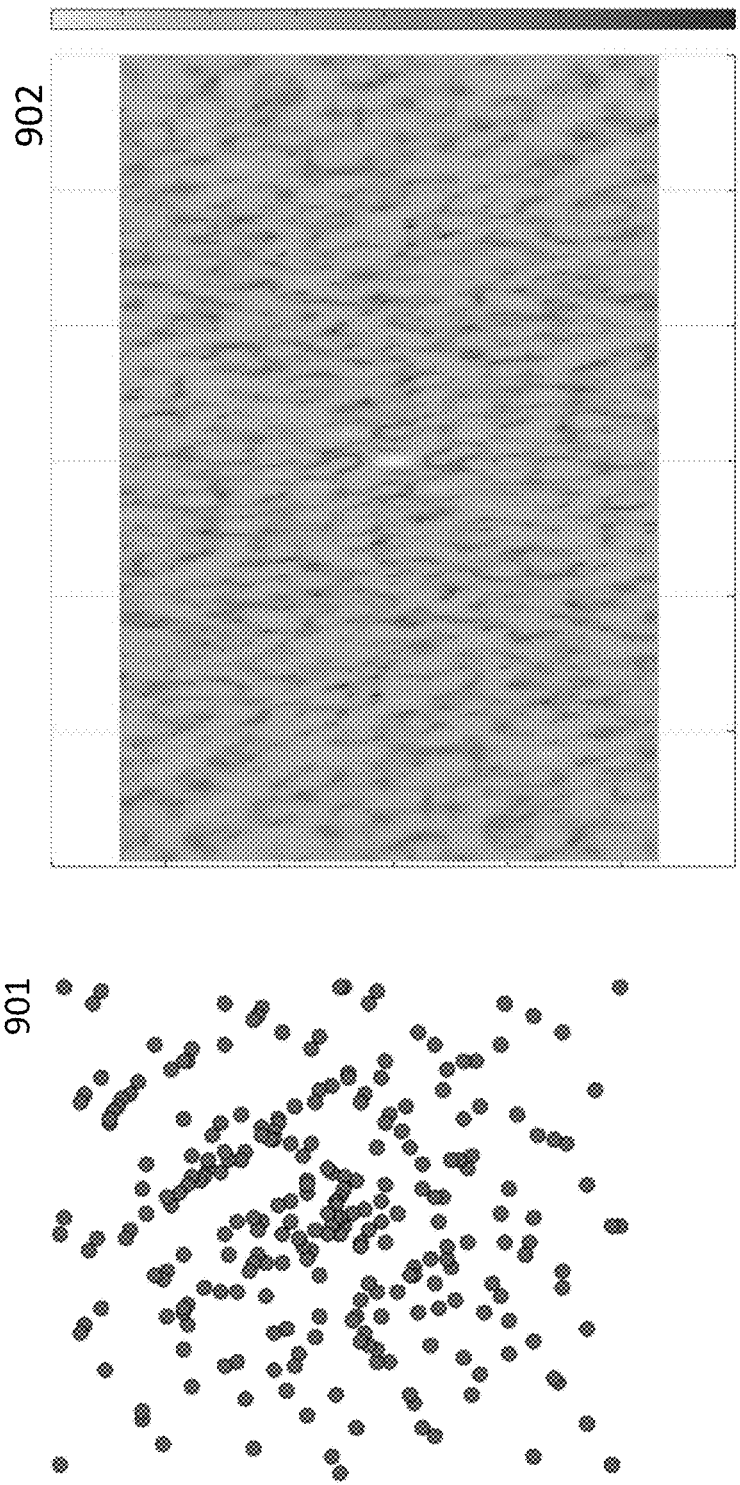
FIG. 9 Non-uniform or Sparse Array

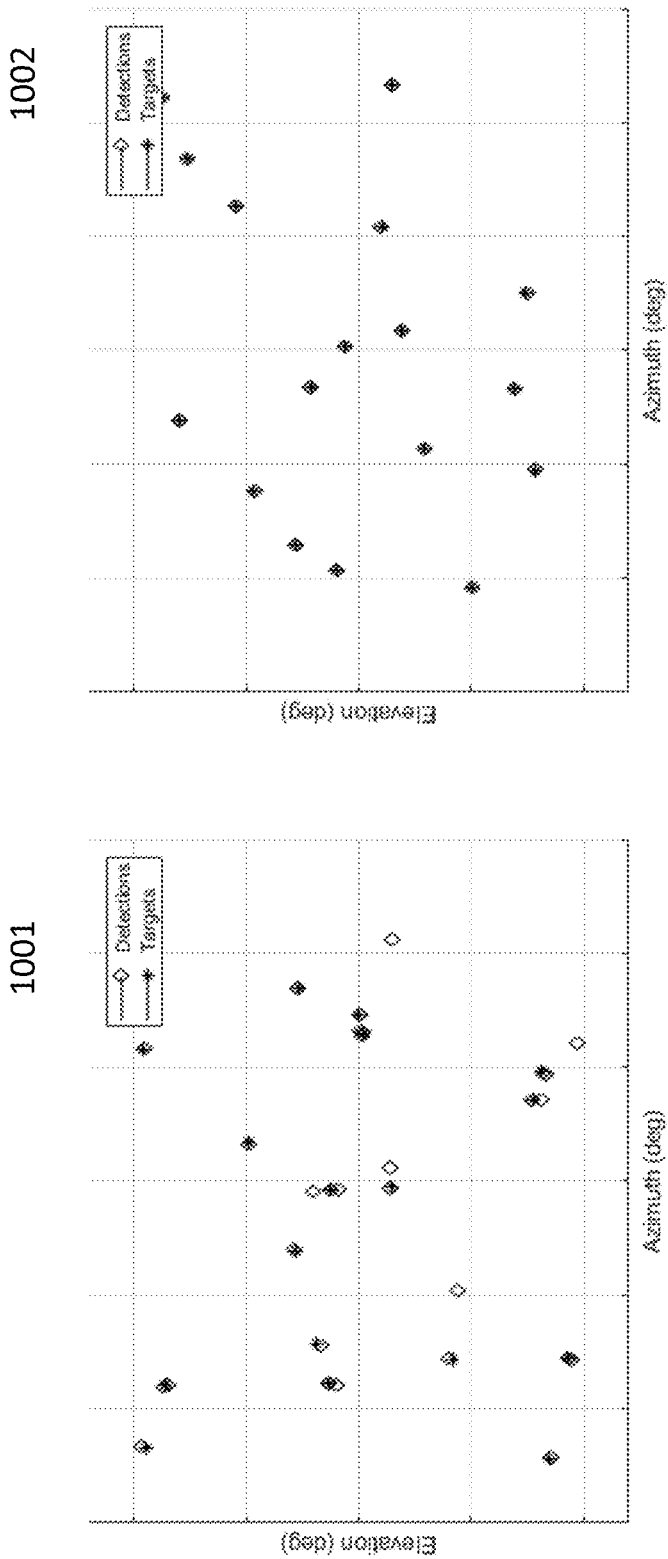
FIG. 10 Ghost Targets

RADAR SYSTEM WITH ENHANCED PROCESSING FOR INCREASED CONTRAST RATIO, IMPROVED ANGULAR SEPARABILITY AND ACCURACY, AND ELIMINATION OF GHOST TARGETS IN A SINGLE-SNAPSHOT

CROSS REFERENCE TO RELATED APPLICATION

The present application claims the filing benefits of U.S. provisional application, Ser. No. 63/285,258, filed Dec. 2, 2021, which is hereby incorporated by reference herein in its entirety.

FIELD OF THE INVENTION

The present invention is directed to radar systems, and more particularly to radar systems for vehicles and robotics.

BACKGROUND OF THE INVENTION

The use of radar to determine direction, range, and velocity of objects in an environment is important in a number of applications including automotive radar, robotic sensing, and positioning. The performance of these radars are often limited by the angular separability, contrast ratio, accuracy, and presence of ghost targets when using standard processing chains.

SUMMARY OF THE INVENTION

Methods and systems of the present invention provide for a radar system that implements an enhanced processing chain to detect targets beyond the detectable contrast of conventional radar with improved angular separability, accuracy, and a reduction in the presence of ghost targets. The processing chain of the radar detects the strongest target, subtracts the signal contribution from that target from the measured antenna responses, then continues to detect additional targets that may have been previously undetectable before signal subtraction. Before each subtraction, the processing chain of the radar jointly optimizes its estimated parameters of all previous detections. These estimated parameters are not limited to the target azimuth, elevation, magnitude, and phase. The joint estimation reduces residual errors which prevents ghost targets from being detected.

In a radar system of the present invention for a robot or vehicle that uses an enhanced processing chain includes at least one transmitter, at least one receiver, and at least one antenna. The transmitter is configured to transmit radio signals. The receiver is configured to receive a reflected radio signal. The reflected radio signal is the transmitted radio signal(s) reflected from an object or multiple objects in an environment. The at least one receiver is also configured to receive radio signals transmitted by other similar systems.

In a radar system of the present invention with enhanced processing for increased contrast ratio, improved angular separability and accuracy, and elimination of ghost targets includes transmitters, receivers, pluralities of transmit antennas, and pluralities of receive antennas. The enhanced processing chain on-board the radar system iteratively detects target(s) by first finding the strongest target, subtracting the estimated received signal from the detected target, and repeating the process for subsequent targets until a predefined number of iterations is completed or an exit condition is tripped. The enhanced processing chain's subtraction increases the contrast ratio of detectable targets. The detection is thus refined by determining optimal azimuth, elevation, gain, and phase of each detection through a joint optimization of all detections. The subtraction and refinement aid in eliminating ghost targets by removing sidelobe signals and residual errors that cause ghost targets to appear.

In an aspect of the present invention, the radar system performs the enhanced detection for multiple targets at any combination of range distances, Doppler velocities, azimuth angles, and elevation angles within the radar system's operable limits.

In another aspect of the present invention, the radar system modifies its enhanced processing chain to optimize different objective functions. These modifications include detection thresholds, the number of iterations used in joint estimation, a method of performing joint estimation, and a beamforming codebook.

In a further aspect of the present invention, the radar system executes the entirety of the enhanced detection algorithm on the data collected within a single snapshot. A single snapshot refers to a single time-instance of radar data collection.

These and other objects, advantages, purposes and features of the present invention will become apparent upon review of the following specification in conjunction with the drawings.

BRIEF DESCRIPTION OF THE DRAWINGS

FIG. 6B is a flow diagram illustrating the steps to a method for performing a step of the method illustrated in FIG. 6A in accordance with the present invention;

FIG. 7 is a signal diagram illustrating the sum-of-squared residual minimization performed by the enhanced detection procedure during the estimation of detection parameters in accordance with the present invention;

FIG. 8 is a diagram illustrating an exemplary uniform rectangular antenna array geometry and an exemplary beam response pattern of such an array geometry, in accordance with the present invention;

FIG. 9 is a diagram illustrating an exemplary sparse antenna array geometry and an exemplary beam response pattern of such an array geometry in accordance with the present invention; and FIG. 10 is diagram illustrating an exemplary detection using a conventional detection algorithm and using the enhanced detection procedure, showing the removal of ghost targets in accordance with the present invention.

DESCRIPTION OF THE PREFERRED EMBODIMENTS

The present invention will now be described with reference to the accompanying figures, wherein numbered elements in the following written description correspond to like-numbered elements in the figures. Methods and systems of the present invention achieve increased angular separability, contrast ratios, improved accuracy, and elimination of ghost targets.

Figure 1A:
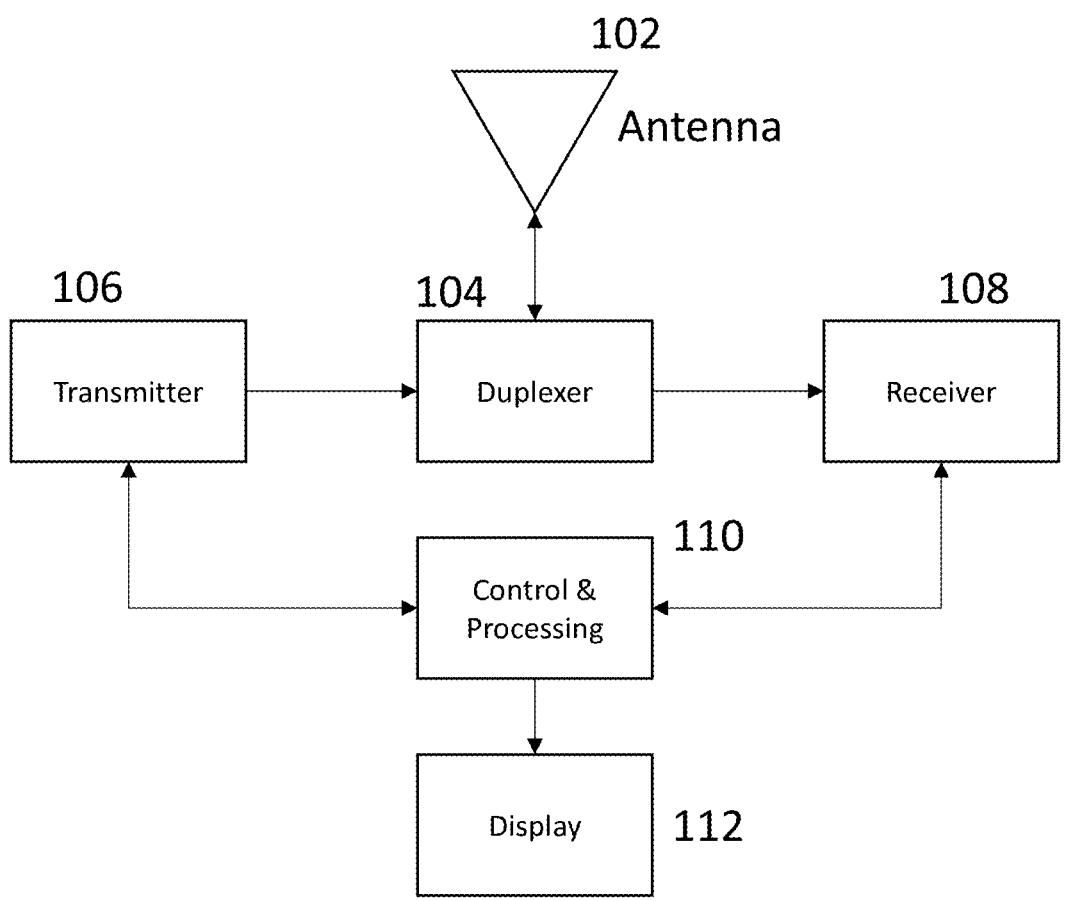
FIG. 1A and FIG. 1B are block diagrams of radar systems in accordance with the present invention.

FIG. 1A illustrates an exemplary radar system 100 with an antenna 102 that is time-shared between a transmitter 106 and a receiver 108 via a duplexer 104. As also illustrated in FIG. 1A, output from the receiver 108 is received by a control and processing module 110 that processes the output from the receiver 108 to produce display data for the display 112. The control and processing module 110 is also operable to produce a radar data output that is provided to other control units. The control and processing module 110 is also operable to control the transmitter 106.

Figure 1B:
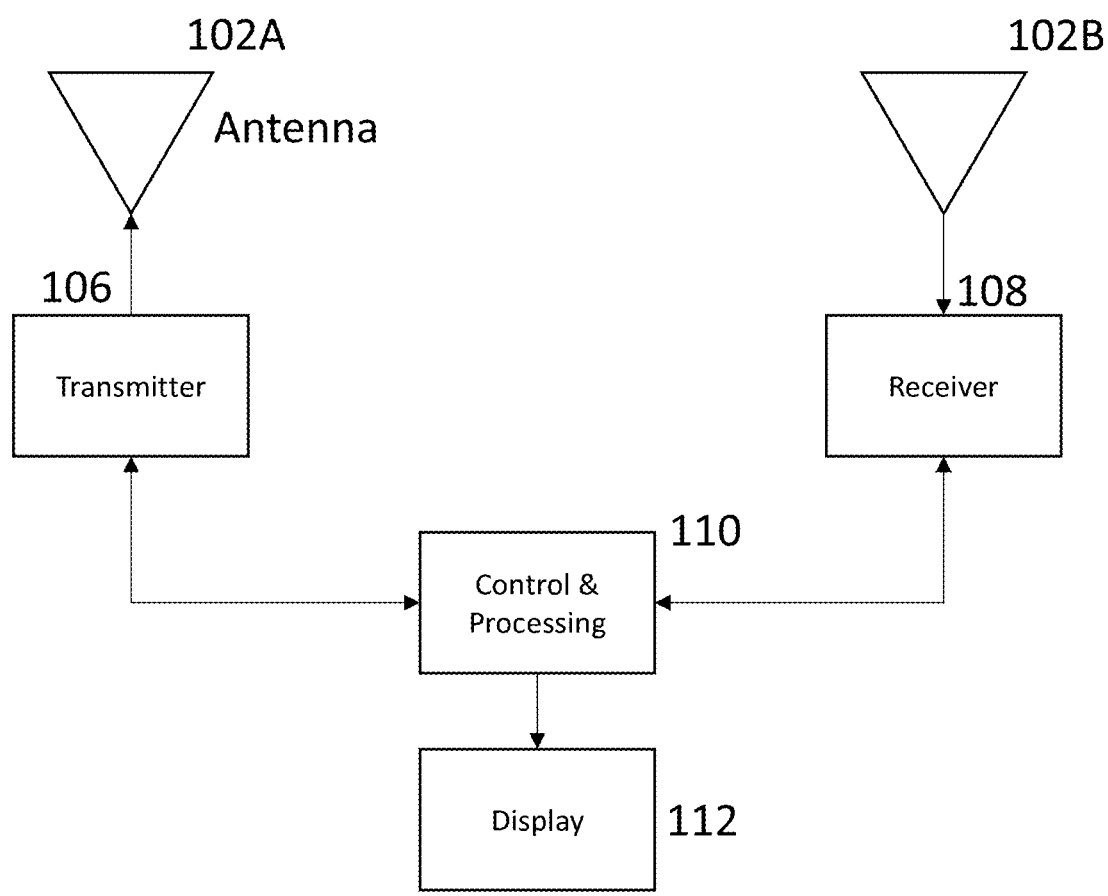

FIG. 1B illustrates an alternative exemplary radar system 150 with a pair of antennas 102a, 102b: an antenna 102a for the transmitter 106 and another antenna 102b for the receiver 108.

Figure 2:
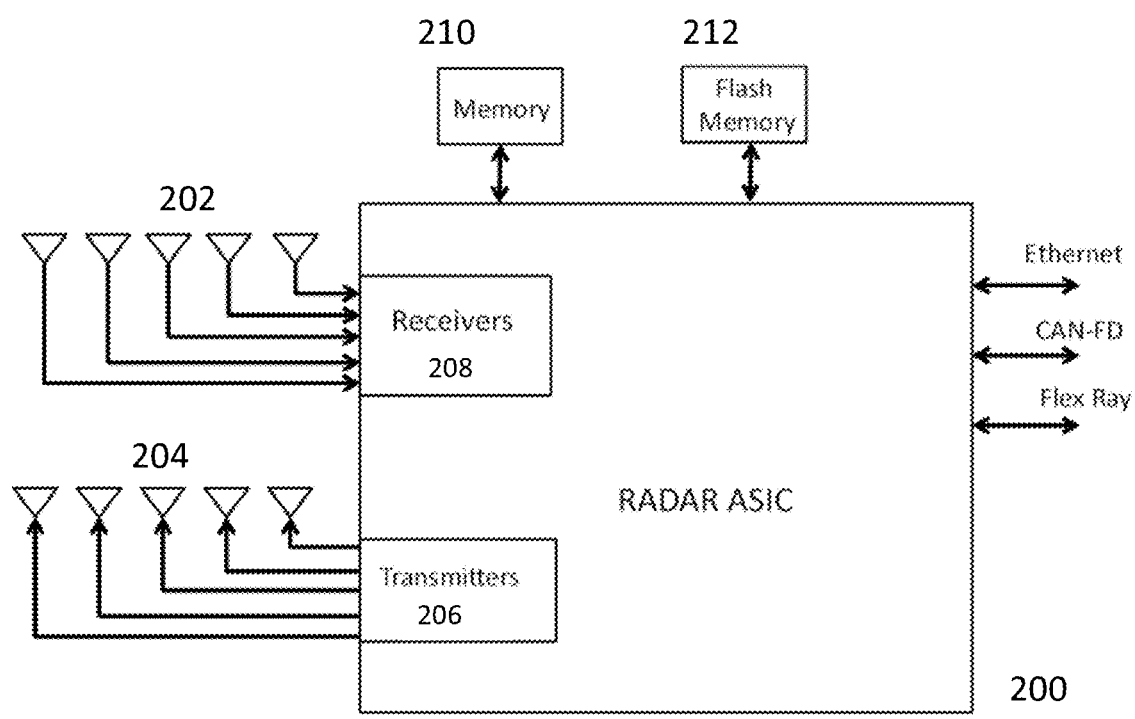
FIG. 2 is a block diagram illustrating a radar system with a plurality of receivers and a plurality of transmitters (MIMO radar) in accordance with the present invention.

An exemplary MIMO radar system is illustrated in FIG. 2. With MIMO radar systems, each transmitter signal is rendered distinguishable from every other transmitter by using appropriate differences in the modulation, for example, different digital code sequences. Each receiver correlates with each transmitter signal, producing a number of correlated outputs equal to the product of the number of receivers with the number of transmitters. The outputs are deemed to have been produced by a number of virtual receivers, which can exceed the number of physical receivers.

FIG. 2 illustrates an exemplary radar system 200 with multiple antennas 202, 204, transmitters 206 and receivers 208. Using multiple antennas allows a radar system 200 to determine the angle of objects/targets in the environment. Depending on the geometry of the antenna system 200, different angles (e.g., with respect to the horizontal or vertical) can be determined. The radar system 200 may be connected to a network via an Ethernet connection or other types of network connections 214. The radar system 200 includes memory 210, 212 to store software used for processing the received radio signals to determine range, velocity, and location of objects/targets in the environment. Memory may also be used to store information about objects/targets in the environment.

Figure 3:
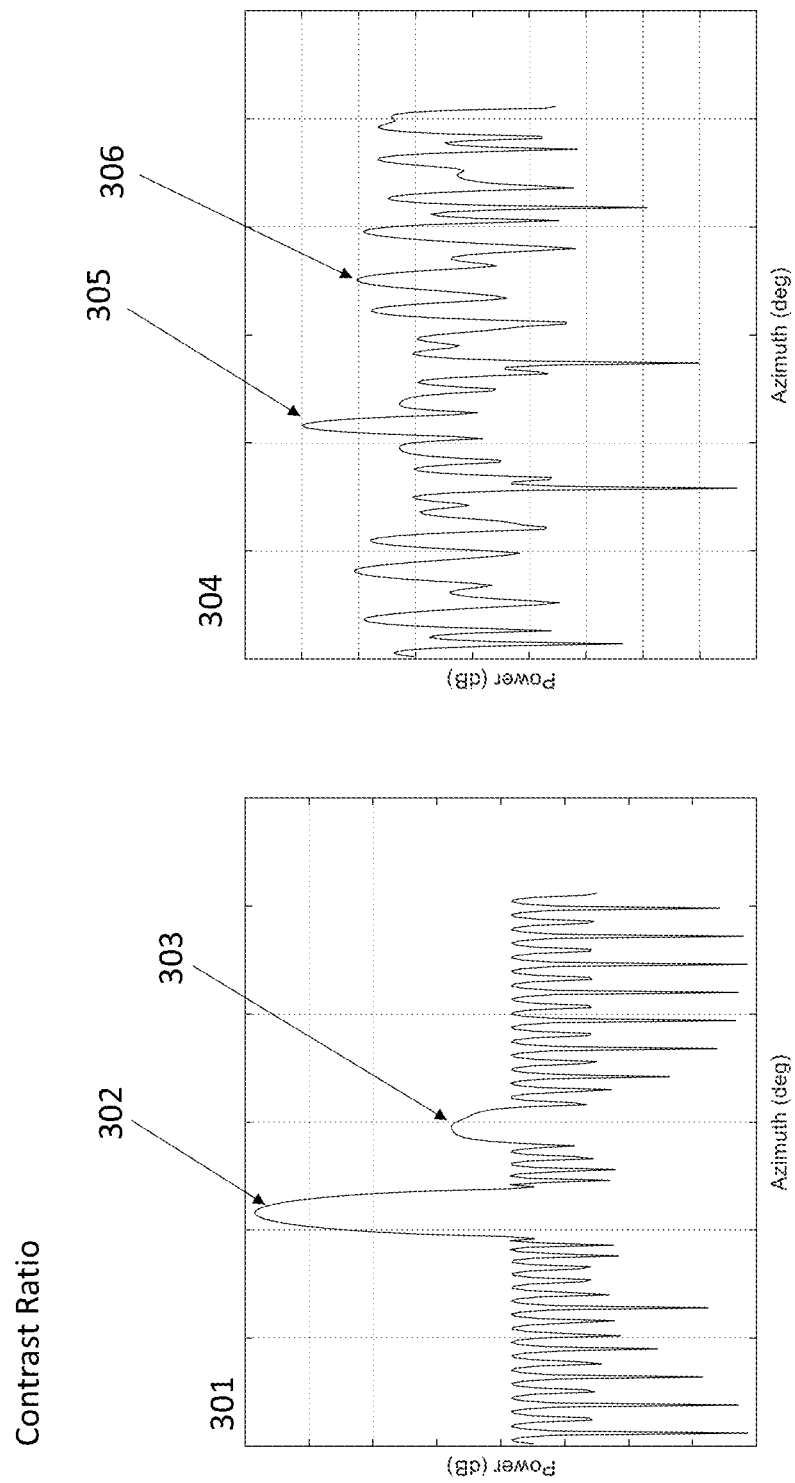
FIG. 3 is a signal diagram illustrating the beamformed response of 2 antenna array geometries with 2 targets present with a high contrast ratio in power in accordance with the present invention.

FIG. 3 is a diagram of the beam response of 2 array geometries, the first response 301 being from a uniform linear array and the second response 304 being from a non-uniform array. The highest power target is detectable from the response (i.e., signal peaks 302, 305) from both the uniform array (301) and the non-uniform array (304). However, the lowest power target is only detectable in the response (i.e., signal peak 303) of the uniform array (301). The response 304 of the non-uniform array exhibits significant sidelobes 306 which have a stronger power than that of the lowest power target. Therefore, conventional detection algorithms are incapable of detecting the lowest power target using the non-uniform array.

Figure 4:
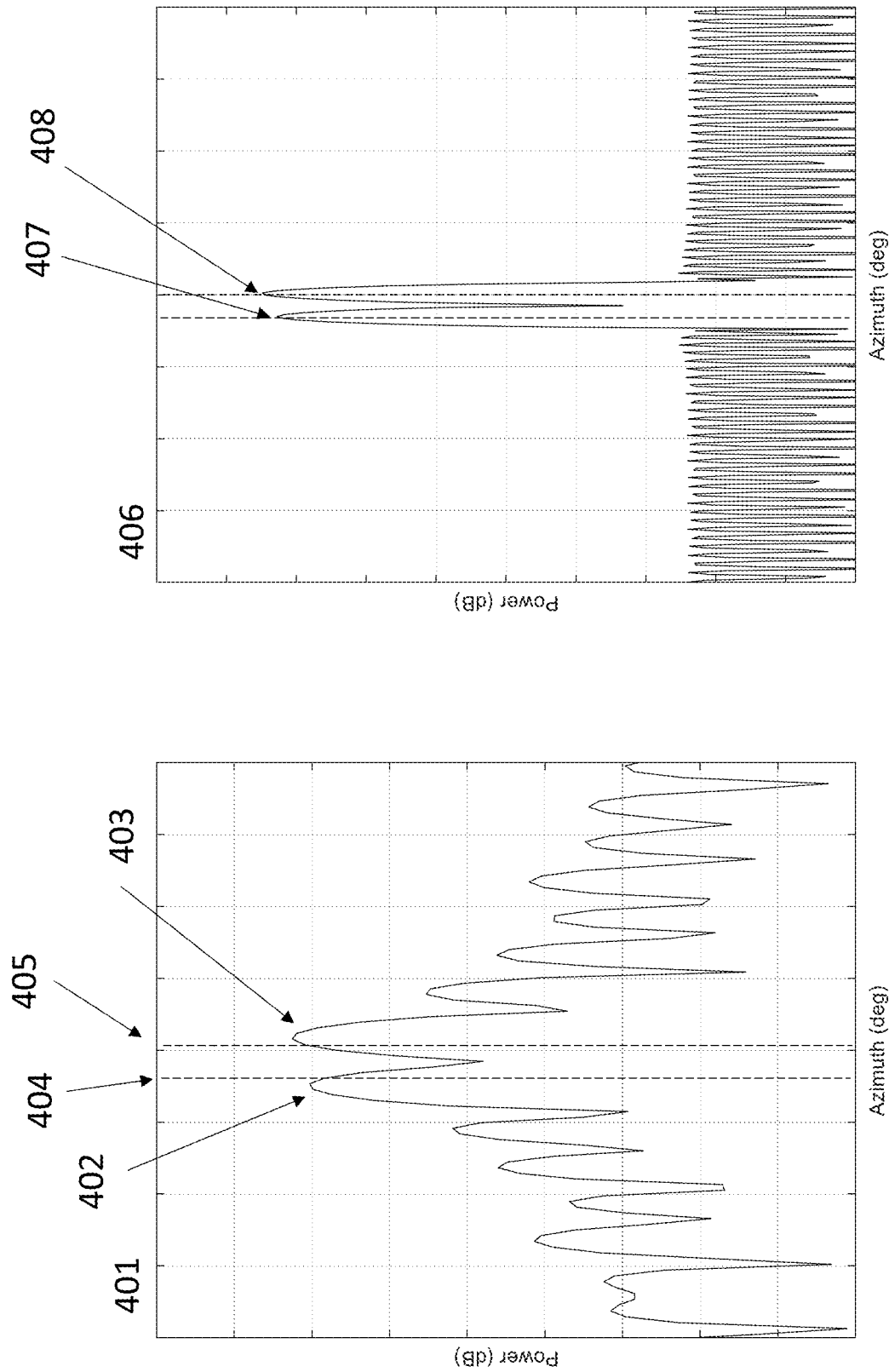
FIG. 4 is a signal diagram illustrating the beamformed response of 2 antenna array geometries with 2 targets present with small separations between themselves, showing a bias in angular estimation in accordance with the present invention.

FIG. 4 is a diagram of the beam response of 2 array geometries with 2 targets present with equal power and a moderate angular separation. The first response 401 is from conventional beamforming on a uniform array in the presence of noise. The second response 406 is generated from the detections of the enhanced detection procedure. In the first response 401, both targets are detectable 402, 403, but exhibit a bias in angle from their true positions (404, 405, respectively). In the ideal array response, the larger aperture tightens the beams thereby reducing the angular bias in the positions of the 2 targets 407, 408.

Figure 5:
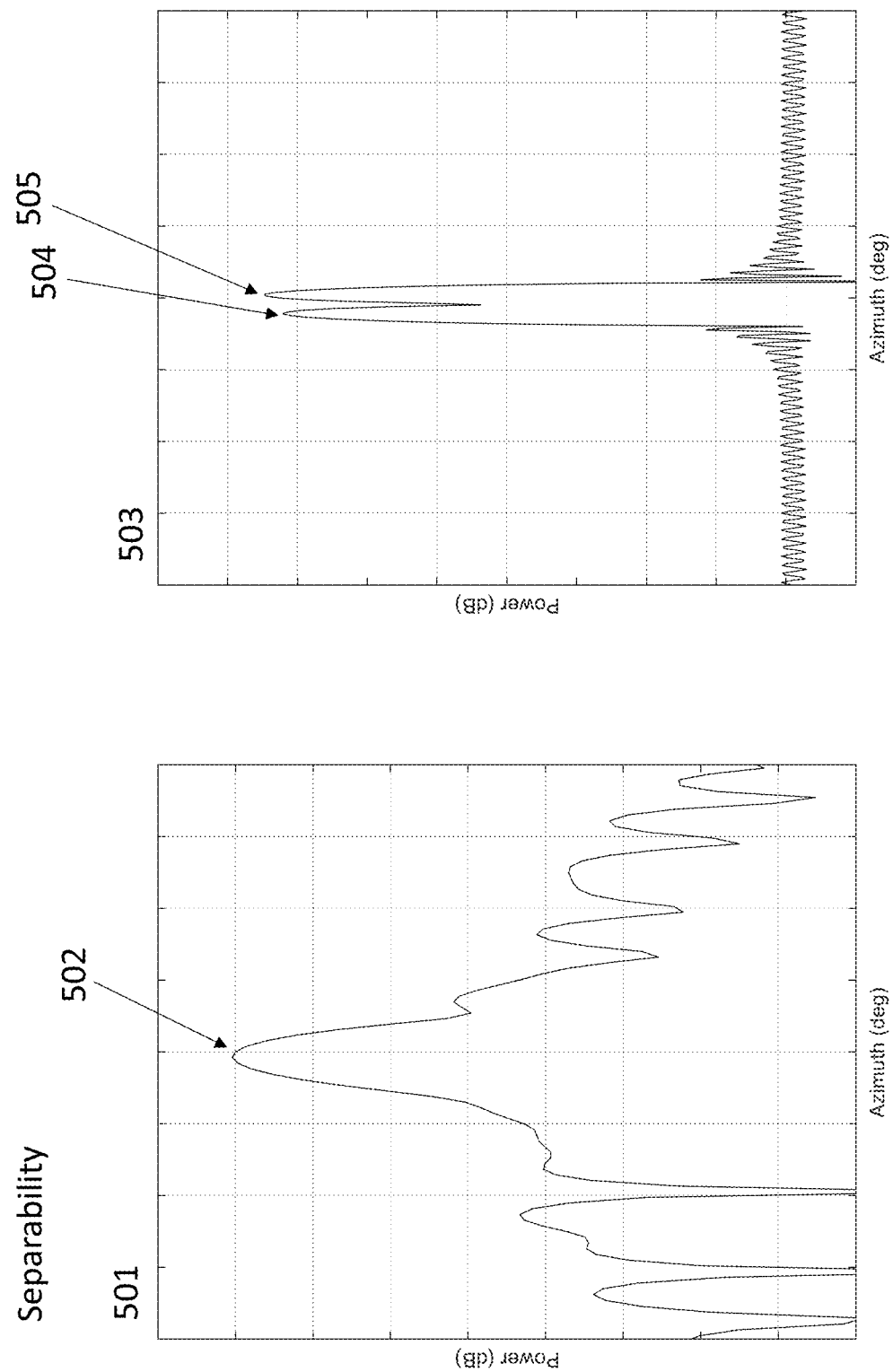
FIG. 5 is a signal diagram illustrating the beamformed response of 2 antenna array geometries with 2 targets present with small separations between themselves, showing the disambiguation between targets, in accordance with the present invention.

FIG. 5 is a diagram of the beam response of 2 array geometries with 2 targets present with equal power and a small angular separation. The first response 501 is from conventional beamforming on a uniform array in the presence of noise. The second response 503 is generated from the detections of the enhanced detection procedure. In the first response 501, the 2 targets are indistinguishable and only appear as a single target (i.e., signal peak 502). In the second response 503, both targets (i.e., signal peaks 504, 505) are clearly distinguishable.

The radar data is described by the following exemplary mathematical model. Denoting az and el as the azimuth and elevation angles (in radians) to the target, define the u-v space as:

$$u = \sin(az)\cos(el)$$

$$v = \sin(el)$$

Let there be K targets within a single range-doppler bin. Each target has a complex magnitude $\alpha_k$ and u-v position of $(u_k, v_k)$. Let there be N array elements, with positions $(p_n, q_n)$. The array response from all targets is defined as:

$$y_n = \sum_{k=1}^{K} \alpha_k \exp(j2\pi p_n u_k) \exp(j2\pi q_n v_k)$$

Figure 6A:
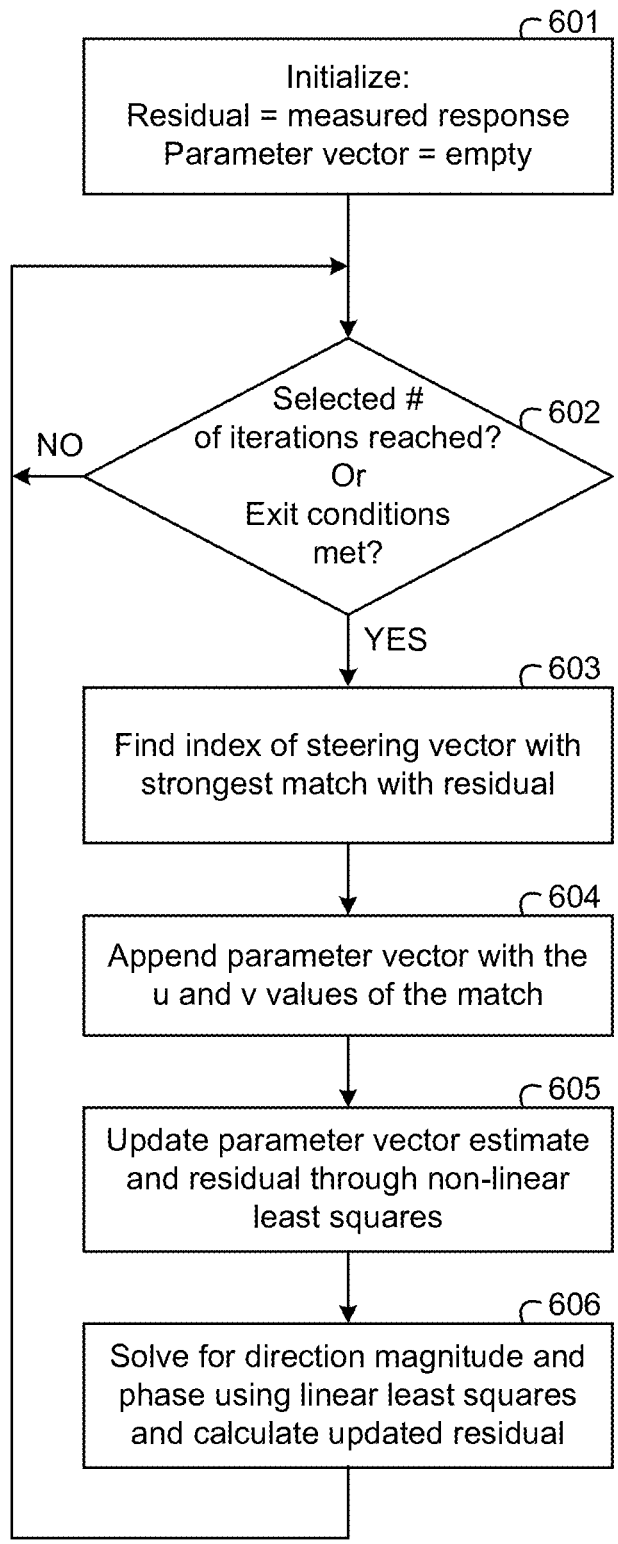
FIG. 6A is a flow diagram illustrating the steps to a method for an enhanced detection procedure, in accordance with the present invention.

FIGS. 6A and 6B are flow diagrams illustrating the steps of an exemplary enhanced detection procedure or algorithm. The algorithm keeps track of two key variables. First is a residual vector, which is the error between the expected response of the estimated detections and the actual measured antenna array response. Second is a parameter vector, which stores the u and v values of the detections. In step 601 of FIG. 6, the residual vector is initialized to the measured antenna array response, and the parameter vector is initialized to be empty. In step 602 of FIG. 6A, a loop begins which executes a predefined number of object detection iterations or until an exit condition is tripped. The exit conditions include but are not limited to 1) the maximum beamformed output of residual falling below a predefined threshold, or 2) the ratio of maximum beamformed output of residual to the mean beamformed output of residual falling below a predefined threshold, or 3) the residual norm squared decreasing (relative to the prior iteration) less than a predefined threshold. In step 603 of FIG. 6A, the beamformed response of the residual vector is computed for a predefined set of steering vectors. The power of the beamformed response is computed for each steering vector. The maximum and mean power is computed to assess if exit condition(s) are tripped. If exit condition(s) are not tripped, the u-v values corresponding to the highest power beamformed response is recorded as the parameters for a new detection. In step 604 of FIG. 6A, these parameters are stored into the parameter vector. In step 605 of FIG. 6A, a non-linear least squares subroutine is called to update the parameter vector. In step 606 of FIG. 6A, the magnitude and phase of each detection are calculated using linear least squares and the residual or error is updated by subtracting the aggregate expected array response from the actual measured antenna array response.

The non-linear least squares subroutine of step 605 of FIG. 6A begins with step 607 of FIG. 6B, where a regularization parameter is initialized. In step 608 of FIG. 6B, the expected array response is computed given the current number of detections and their parameters. This step includes an estimation of the complex amplitudes through linear least squares. Then a loop begins in step 609 of FIG. 6B, which executes for a set number of iterations or until an exit condition is tripped. The exit condition includes, but is not limited to, the residual norm squared decreasing (relative to the prior iteration) less than a predefined threshold. In step 610 of FIG. 6B, a Jacobian matrix is created which contains the partial derivatives of the expected array response with respect to the parameters in the parameter vector. In step 611 of FIG. 6B, a Levenberg-Marquardt update step is taken using the computed Jacobian matrix. In step 612 of FIG. 6B, the expected array response is again computed using the new parameter estimates and an updated residual is calculated. In step 613 of FIG. 6B, a decision is made based on whether the new parameter vector reduced the norm of the residuals. If it did, then in step 614 of FIG. 6B, the update is accepted and the regularization parameter is reduced. Additionally, the exit condition(s) are checked, and the loop exits if any exit condition is tripped. If not, then in step 615 of FIG. 6B, the update is rejected, and the regularization parameter is increased. Alternative variations of the procedure may always accept updates or not use any regularization.

FIG. 7 is a diagram illustrating exemplary plots of the norm of the residual error as a function of a detection's parameters, namely magnitude (701), phase (702), and angle (703). The non-linear least squares subroutine attempts to find the global minima with respect to these parameters. The steering vectors in the matching step are selected to provide a close enough initial estimate of the u-v parameters that the subroutine operates within the convex region of the angular estimate.

FIG. 8 is a diagram illustrating an exemplary antenna array geometry of a uniform rectangular array 801 and a beamformed response 802 at boresight. The beamformed response 802 shows a wide mainlobe. Relative to the mainlobe power, the sidelobe level is manageably low.

FIG. 9 is a diagram illustrating an exemplary antenna array geometry of a sparse array 901 and a beamformed response 902 at boresight. Using the same number of antennas as in FIG. 8, the sparse array's geometry 901 creates a different beamformed response 902. In comparison to the beamformed response 802, the mainlobe in uniform rectangular array 801 is significantly narrower. Relative to the mainlobe, the sidelobe level is increased in the beamformed response 902 compared to the sidelobe level in beamformed response 802. The enhanced detection procedure allows the array in the sparse array 901 to detect targets below its sidelobe level, allowing array designs to be used that provide benefits in beamwidth and therefore angular resolution.

FIG. 10 is a diagram illustrating an exemplary detection of targets without joint parameter estimation 1001 and with joint parameter estimation 1002 following the enhanced detection procedures. In the joint parameter estimation 1001, there are numerous ghost detections that do not correspond to actual targets. The detections also have notable angular error. In the joint parameter estimation 1002, the number of ghost detections and the angular error are both reduced significantly.

Thus, as discussed herein, exemplary radar receivers are configured to perform an enhanced object detection procedure allowing for the detection of objects with signal strengths below a given array's sidelobe signal levels (and thus reducing the number of ghost detections). Accordingly, array designs may be used that provide benefits in beamwidth and angular resolution by iteratively enhancing object detection such that the collected radar data comprises residual vectors with increasingly smaller errors between the expected response of estimated detections and actual measured responses.

Changes and modifications in the specifically described embodiments can be carried out without departing from the principles of the present invention, which is intended to be limited only by the scope of the appended claims, as interpreted according to the principles of patent law including the doctrine of equivalents.

The invention claimed is:

1. A radar system comprising:
a transmitter configured to transmit radio signals;
a receiver configured to receive radio signals that include the transmitted radio signals transmitted by the transmitter and reflected from objects in an environment;
wherein the receiver is configured to receive radio signals transmitted by other radar systems; and
wherein the receiver is configured to utilize an iterative target detection process operable to perform a target detection and parameter estimation process that iteratively detects targets in the received radio signals by detecting a target that is a strongest target, subtracting an estimated received signal from the detected target signal to calculate a residual error, and repeatedly detecting a next target that is a strongest target and subtracting the estimated received signal from the next detected target signal until at least one of a plurality of exit conditions is reached, wherein a first exit condition of the plurality of exit conditions comprises a completion of a selected quantity of iterations, such that targets in the received radio signals are detectable with signal strengths below a given sidelobe signal level.

2. The radar system of claim 1, wherein the receiver is configured to calculate radar data comprising increasingly smaller residual errors between an expected response of estimated detections and actual measured responses.

3. The radar system of claim 1, wherein the receiver is operable to perform the iterative target detection process to first perform conventional beamforming to find approximate parameters of a target and to then perform a joint estimation of target parameters for all targets for each new detection added to a detection list.

4. The radar system of claim 3, wherein the approximate parameters comprise azimuth/elevation angles, magnitudes, and phase of the target.

5. The radar system of claim 3, wherein the receiver is operable to take a ratio of the maximum conventional beamforming output to the mean conventional beamforming output and compare this ratio to a predetermined threshold and use the result as another exit condition of the plurality of exit conditions of the target detection process.

6. The radar system of claim 3, wherein the receiver is operable to compare a change in a residual norm between the current and prior iteration to a predefined threshold and to use the result as another exit condition of the plurality of exit conditions of the target detection process.

7. The radar system of claim 3, wherein the receiver is operable to compare the change in a residual norm between the current and prior iteration to a predefined threshold and the result is used as another exit condition of the plurality of exit conditions of the target detection process and to end the joint estimation.

8. The radar system of claim 1, wherein the receiver is operable to execute the entirety of an enhanced detection algorithm on the data collected within a single snapshot, and wherein the single snapshot is a single time-instance of radar data collection.

9. The radar system of claim 1, wherein the transmitter and the receiver are configured for use in a robot and/or a vehicle.

10. The radar system of claim 1, wherein the other radar systems comprise a known radar system.

11. A radar system comprising:
a plurality of transmitters configured to transmit radio signals;
a plurality of receivers configured to receive radio signals that include the transmitted radio signals transmitted by the transmitters and reflected from objects in an environment;
wherein the receivers are configured to utilize an enhanced processing procedure to increase accuracy and reduce the presence of ghost targets;
wherein the receivers are configured to detect targets, and wherein the receivers are operable to detect a first target and to subtract a signal contribution from the first target from a measured antenna response, and to then iteratively detect one or more additional targets that are farther away than the first target which was previously undetectable before signal subtraction and subtract corresponding signal contributions from the one or more additional targets from the measured antenna response until at least one of a plurality of exit conditions is reached, and wherein a first exit condition of the plurality of exit conditions comprises a completion of a selected quantity of iterations; and
wherein the receivers are operable to jointly optimize estimated parameters of all previous detections before each subtraction, and wherein the receivers are configured to use the joint estimation to reduce residual errors which prevent ghost targets from being detected by the receivers.

12. The radar system of claim 11, wherein the estimated parameters comprise target azimuth, elevation, magnitude, and phase.

13. The radar system of claim 11, wherein the subtraction of the signal contribution increases a contrast ratio of detectable targets.

14. The radar system of claim 11, wherein the receivers are configured to jointly optimize the estimated parameters through a joint optimization of all target detections, thereby increasing the accuracy of the radar system.

15. The radar system of claim 14, wherein the target subtraction and refinement both aid in eliminating ghost targets by removing sidelobe signals and residual errors which cause ghost targets to appear.

16. The radar system of claim 11, wherein the transmitters and receivers are each configured for use in a robot and/or a vehicle.

17. The radar system of claim 11, wherein the receivers are configured to receive radio signals transmitted by other radar system comprising at least one known radar system.

* * * * *